(12) United States Patent
Van de Water

(10) Patent No.: US 7,668,572 B2
(45) Date of Patent: Feb. 23, 2010

(54) SYSTEM AND METHOD OF POLARITY REVERSAL FOR RELOAD DETECTION

(75) Inventor: Cor Van de Water, Sunnyvale, CA (US)

(73) Assignee: Proxim Wireless Corporation, San Jose, CA (US)

( * ) Notice: Subject to any disclaimer, the term of this patent is extended or adjusted under 35 U.S.C. 154(b) by 235 days.

(21) Appl. No.: 11/252,976

(22) Filed: Oct. 17, 2005

(65) Prior Publication Data

US 2006/0128319 A1    Jun. 15, 2006

Related U.S. Application Data

(60) Provisional application No. 60/619,362, filed on Oct. 15, 2004.

(51) Int. Cl.
*H04B 1/38* (2006.01)

(52) U.S. Cl. .......... 455/572; 455/343.1; 455/3.02; 375/219; 375/340; 370/286

(58) Field of Classification Search .......... 455/572, 455/419, 420, 3.02, 573–574, 343.1–343.4, 455/127.1–127.5; 340/310.11–310.16; 375/340, 375/257, 219, 233; 370/286
See application file for complete search history.

(56) References Cited

U.S. PATENT DOCUMENTS

| 3,418,649 | A | * | 12/1968 | Williamson | 340/507 |
| 3,728,701 | A | * | 4/1973 | Reynolds et al. | 340/536 |
| 3,949,169 | A | * | 4/1976 | Braeckelmann | 375/257 |
| 4,980,648 | A | * | 12/1990 | Jaeger et al. | 329/308 |
| 5,315,597 | A | * | 5/1994 | Yang et al. | 455/572 |
| 5,577,023 | A | * | 11/1996 | Marum et al. | 370/286 |
| 5,903,613 | A | * | 5/1999 | Ishida | 375/340 |
| 6,906,618 | B2 | * | 6/2005 | Hair et al. | 340/538.15 |
| 7,095,981 | B1 | * | 8/2006 | Voroba et al. | 455/41.2 |
| 2002/0160740 | A1 | * | 10/2002 | Hatcher et al. | 455/317 |
| 2003/0085621 | A1 | * | 5/2003 | Potega | 455/127.1 |
| 2004/0202271 | A1 | * | 10/2004 | Fahim | 375/233 |
| 2004/0240523 | A1 | * | 12/2004 | Mimura et al. | 375/219 |
| 2005/0151623 | A1 | * | 7/2005 | von Hoffmann | 340/310.11 |
| 2007/0041545 | A1 | * | 2/2007 | Gainsboro | 455/572 |
| 2008/0027671 | A1 | * | 1/2008 | Sano et al. | 702/141 |
| 2009/0052509 | A1 | * | 2/2009 | Agazzi | 375/219 |

\* cited by examiner

*Primary Examiner*—Lana N Le
(74) *Attorney, Agent, or Firm*—Townsend and Townsend and Crew LLP

(57) ABSTRACT

A system and method to remotely activate a procedure, preferably to Reload, a transceiver unit powered with an Ethernet cable. The system and method includes a power source including circuitry to reverse the polarity of voltage for a desired amount of time to a detection circuit in the transceiver unit. Upon successful detection, a reload circuit preferably in the transceiver unit activates the Reload procedure in the transceiver unit.

26 Claims, 5 Drawing Sheets

SYSTEM AND METHOD OF POLARITY REVERSAL FOR RELOAD DETECTION

CROSS REFERENCE TO RELATED APPLICATIONS

This application claims the priority to U.S. Provisional Patent Application Ser. No. 60/619,362 filed Oct. 15, 2004 in the name of the same inventor which is hereby incorporated by reference herein.

FIELD OF THE INVENTION

The invention relates to a wireless network system, in general, and more particularly to a system and method utilizing polarity reversal of supplied voltage for triggering a function at a remote unit.

BACKGROUND OF THE INVENTION

Transceiver units are utilized to send and receive signals over a medium. The transceiver unit may include a "Reset" button and a "Reload" button. The Reload button on a transceiver unit may be physically inaccessible when the transceiver unit is placed inside an enclosure (for example for weatherproofing) and/or on a remote location, such as a roof or tower.

One method of attempting to position the Reload button in a more conveniently accessible location is to have one of the power wires of a two wired system that is connected to the transceiver unit be dedicated to the Reload button information. However, this method is disadvantageous, because removing one of the dedicated power wires reduces reliability in providing data and power to the transceiver unit. Another problem is that the such method is not compatible with the utilizing an Ethernet cable that complies with the EEE 802.3af standard.

A need therefore exists for a method and apparatus for remotely triggering the reload button function of a transceiver unit that is positioned in a location that is not easily accessible.

BRIEF DESCRIPTION

A system and method to remotely activate via a power source a Reload and/or Reset function in a transceiver unit preferably powered with an Ethernet cable. The system and method includes a power source which preferably includes circuitry to reverse the polarity of voltage for a desired amount of time to a detection circuit in the transceiver unit. Upon successful detection, a reload circuit preferably in the transceiver unit activates the Reload procedure in the transceiver unit.

BRIEF DESCRIPTION OF THE DRAWINGS

The accompanying drawings, which are incorporated into and constitute a part of this specification, illustrate one or more embodiments of the invention and, together with the detailed description, serve to explain the principles and implementations of the invention.

In the drawings.

DETAILED DESCRIPTION

Embodiments of the invention are described herein in the context of a wireless network system which utilizes a remote triggering of a reload procedure. Those of ordinary skill in the art will realize that the following detailed description of the invention is illustrative only and is not intended to be in any way limiting. Other embodiments of the invention will readily suggest themselves to such skilled persons having the benefit of this disclosure. Reference will now be made in detail to implementations of the invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
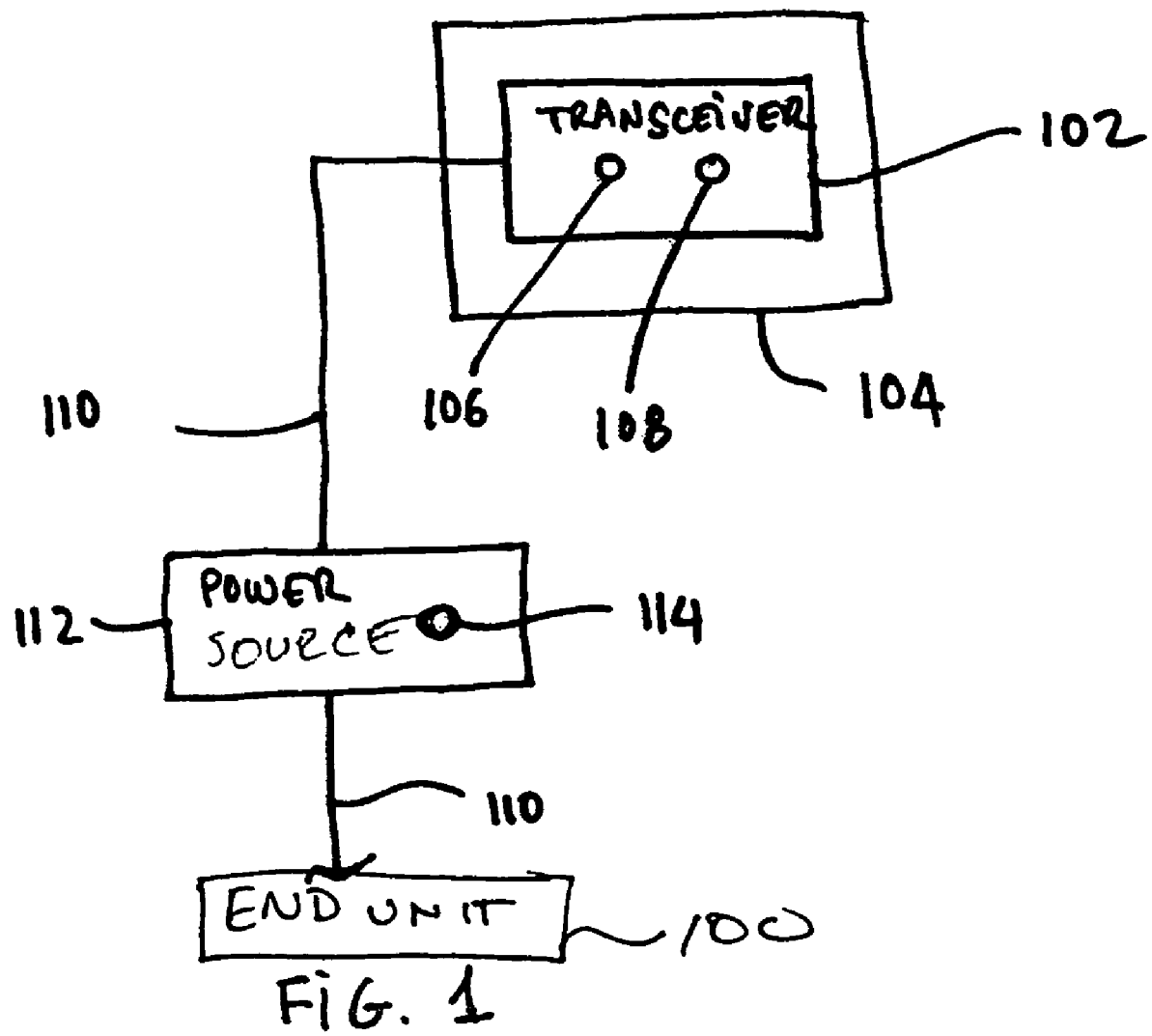
FIG. 1 illustrates a diagram of a system for remotely activating a Reload process in a transceiver unit in accordance with an embodiment of the invention.

FIG. 1 illustrates a transceiver 102 positioned at a remote location in accordance with an embodiment of the invention. The remote location can be on a tower, roof of a building, or any other physically inaccessible area. The transceiver 102 may be additionally/alternatively stored within a weatherproof enclosure 104 for protection from outdoor elements although not necessarily. In an embodiment, the transceiver unit 102 may be part of a wireless network system such as a wireless point-to-point system (e.g. WiFi; WiMAX) although not necessarily. The transceiver 102 preferably includes one or more antennas (not shown), a Reset button 106, and a Reload button 108. The Reload button preferably activates a reload procedure which erases the configuration parameters from the memory of the transceiver unit and/or overall communication system and causes the unit and/or system to reload the default configuration parameters. Usually the Reloading procedure is utilized when a misconfiguration occurs in the unit; when the unit does not start up properly; or when a user has forgotten the password to access the unit. The Reset button activates a Reset procedure which preferably restarts the software in the transceiver unit or system, but does not erase the configuration parameters from the unit's memory.

As shown in FIG. 1, the transceiver unit 102 is connected to an end unit 100 via an Ethernet cable 110 that independently carries power and data between the transceiver unit 102 and end unit 100. The end unit 100 can be any consumer device, communication device, server, router, bridge, PBX, computer, central office, or other electronic device. A power unit 112 is shown in FIG. 1 coupled to the end unit 100 and the transceiver unit 102. In an embodiment, the power unit 112 is a power injector which introduces power to the transceiver unit 102 preferably via the Ethernet cable 110 and is located between the end unit 100 and the transceiver unit 102. It is should be noted that other cables besides Ethernet are contemplated (e.g. Coaxial cables) for use with the system and method. The power unit 112 may alternatively be incorporated in the end unit 100.

In an embodiment, the power unit 112 includes the Reload switch 114 therein. The power unit 112 is shown in FIG. 1 to power the transceiver unit 102 using the Ethernet cable 110, whereby the power unit 112 provides power as well as data signals to the transceiver unit 110 over 2 or 4 twisted pair lines using Power over Ethernet (PoE) technology. It is preferred that the Ethernet cable 110 complies with the IEEE 802.3af standard, although other IEEE standards are contemplated.

The power unit 112, along with the Reload switch 114, is preferably located in an accessible location relative to the transceiver unit 102. For example, the power unit 112 may be placed inside a building whereas the transceiver unit 102 would be located outside. In an embodiment, the Reload switch 114 is located in the power unit 112. In another embodiment, the Reload switch 114 is separate from the power unit 112 but coupled thereto.

Figure 2A:
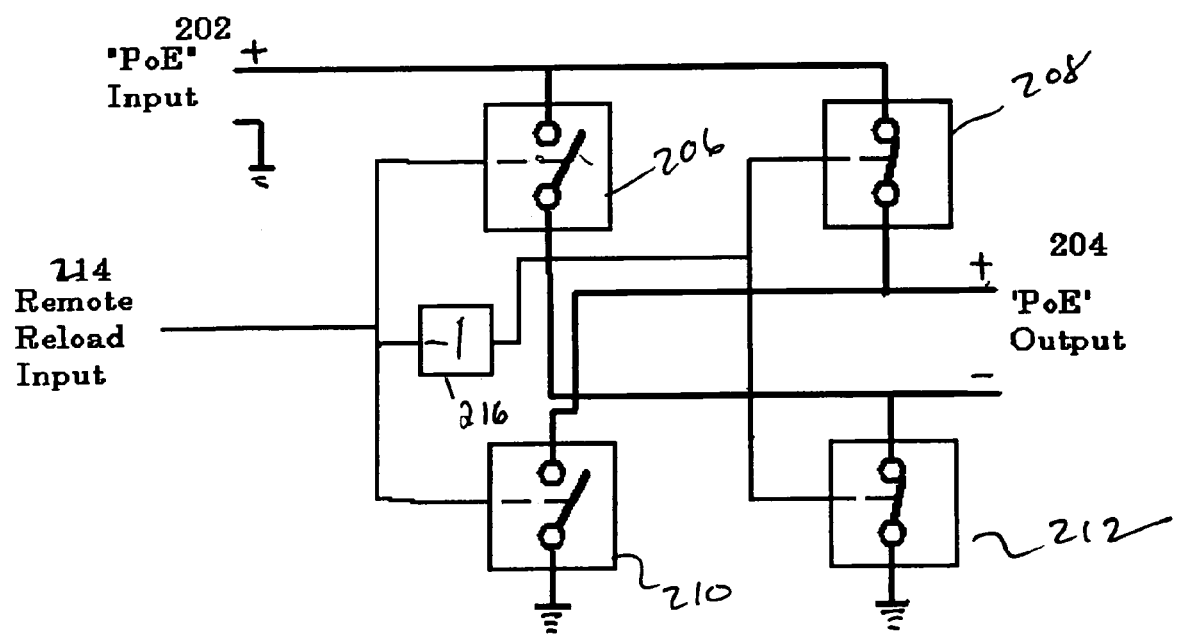
FIG. 2A illustrates a diagram of a voltage reversing circuit in accordance with an embodiment of the invention.
Figure 2B:
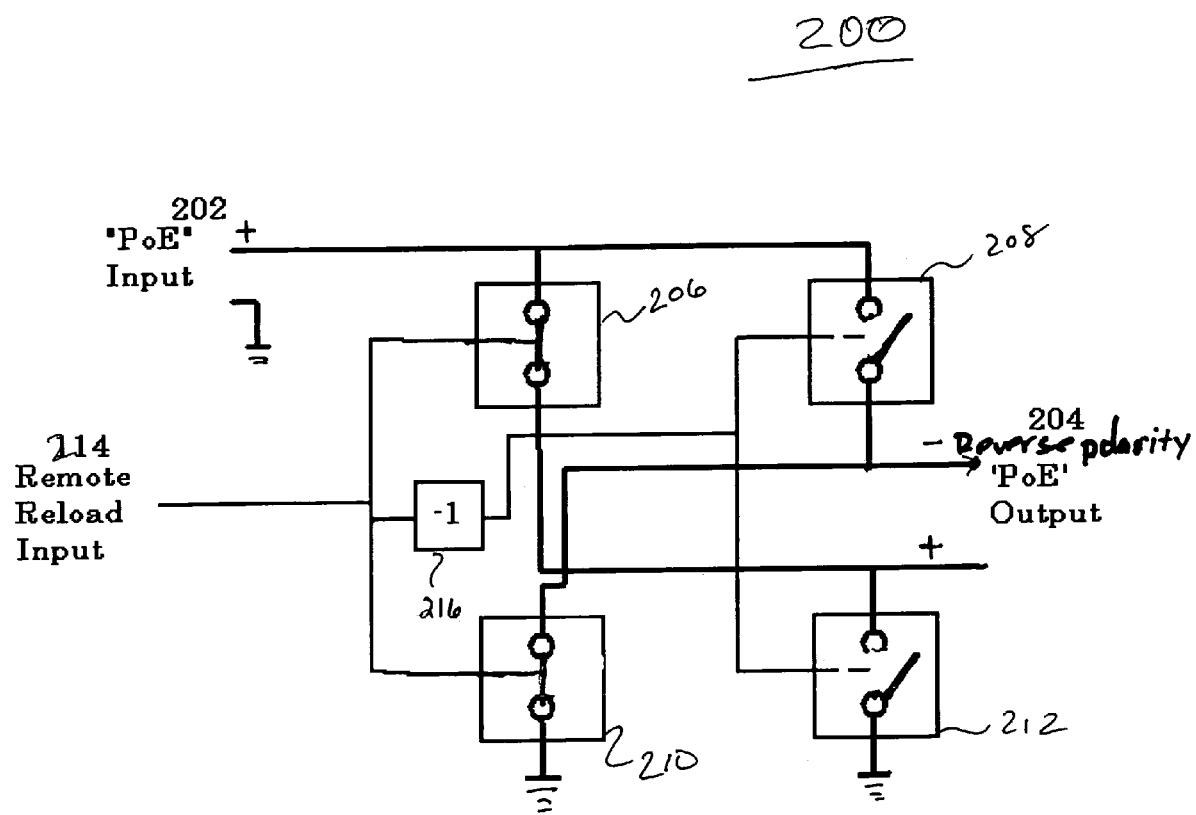
FIG. 2B illustrates a diagram of a voltage reversing circuit in accordance with an embodiment of the invention.

FIGS. 2A and 2B illustrate an example of a polarity reversal circuit capable of reversing the polarity of output voltage in accordance with an embodiment of the invention. In an embodiment, the voltage polarity reversal circuit 200 is located in the remote power source 112 (FIG. 1). In another embodiment, the circuit 200 is located separate from the remote power source 112. The circuit 200 preferably includes an input PoE voltage terminal 202, an output PoE voltage terminal 204, one or more switching components (although four switching components are shown 206, 208, 210, 212), a Reload input terminal 214, and an optional inverter component 216. As shown in FIGS. 2A and 2B, the circuit 200 has an H-Bridge configuration, although it should be noted that the circuit 200 shown in FIGS. 2A and 2B is just one embodiment and is not limited thereto. For instance, the circuit 200 can alternatively include FETs, JFETs, MOSFETs, etc. In another embodiment, the voltage can be reversed by the use of logic gates and/or a digital signal processor. In another embodiment can be the availability of a positive and negative PoE input voltage, so only one toggle switch suffices to reverse the output voltage.

FIG. 2A illustrates the circuit 200 when operating in normal mode whereas FIG. 2B illustrates the circuit 200 reversing the voltage polarity. As shown in FIG. 2A, switch components 206, 208, 210 and 212 are all coupled to the PoE voltage input terminal 202 and Reload input terminal 214 as well as the output terminal 204.

When the circuit operates in the normal mode, as shown in FIG. 2A, switch components 208 and 212 are closed whereas switch components 206 and 210 are open. Accordingly, current from the input terminal 202 only flows through switches 208 and 212 (switch 212 is connected to ground), such that the voltage differential is output through the terminal 204. As shown in FIG. 2A, the lower terminal at the output 204 is thus designated as the negative "−" pole of the voltage whereas the upper terminal at the output 204 is designated as the positive pole "+" of the voltage.

The local Reload switch 114 (FIG. 1) is preferably coupled to the remote Reload input 214. In an embodiment, physical actuation of the Reload switch 114 begins the Reload process. In another embodiment, the Reload switch 114 can be actuated, and thus start the Reload process, internally, through an external wired or wireless signal and/or via software. The remote load input 214 in FIG. 2A is shown inactive whereas the remote load input 214 in FIG. 2B is shown to be active.

As shown in FIG. 2B, actuation of the Reload switch 114 such that the Reload input is active 214 closes control switches 206 and 210 and opens control switches 208 and 212. Accordingly, current flowing from the input terminal 202 then only flows through switches 206 and 210 (switch 210 is connected to ground), such that the voltage differential is output through the terminal 204. As shown in FIG. 2B, the lower terminal at the output 204 is thus positive "+" whereas the upper terminal at the output 204 is negative "−". Therefore, the polarity of the voltage across the output terminals 204 is in the reverse, whereby the reverse polarity voltage signal is output to the terminal unit 102 via the designed pins in the Ethernet cable.

The voltage input into the circuit 200 is preferably 48 Volts to comply with the IEEE 802.3af standard of the Ethernet cable 110, however other voltages are contemplated. The reverse polarity process occurs within a relatively small time duration, preferably 1 millisecond to 100 milliseconds, depending on the type of transceiver unit 102, to prevent the transceiver unit 102 from losing power. Thus, either the power source 112, end unit 100, other intermediate circuit, and/or the transceiver unit 102 includes an internal clock or other mechanism to ensure the polarity reversal occurs within the desired time duration. In an embodiment, if the polarity reversal process lasts longer than the acceptable time duration of the transceiver unit 102, the transceiver unit 102 may undergo a Reset procedure instead of a Reload procedure, although not necessarily. Additionally, or alternatively, if the transceiver unit may undergo a Reset procedure or Reload procedure if a desired number of polarity reversals occur within a desired time duration. For example, the circuit 200 or another circuit 300 can reverse the polarity back and forth three times to cause the transceiver unit 102 to activate the Reload or Reset procedure.

Figure 3:
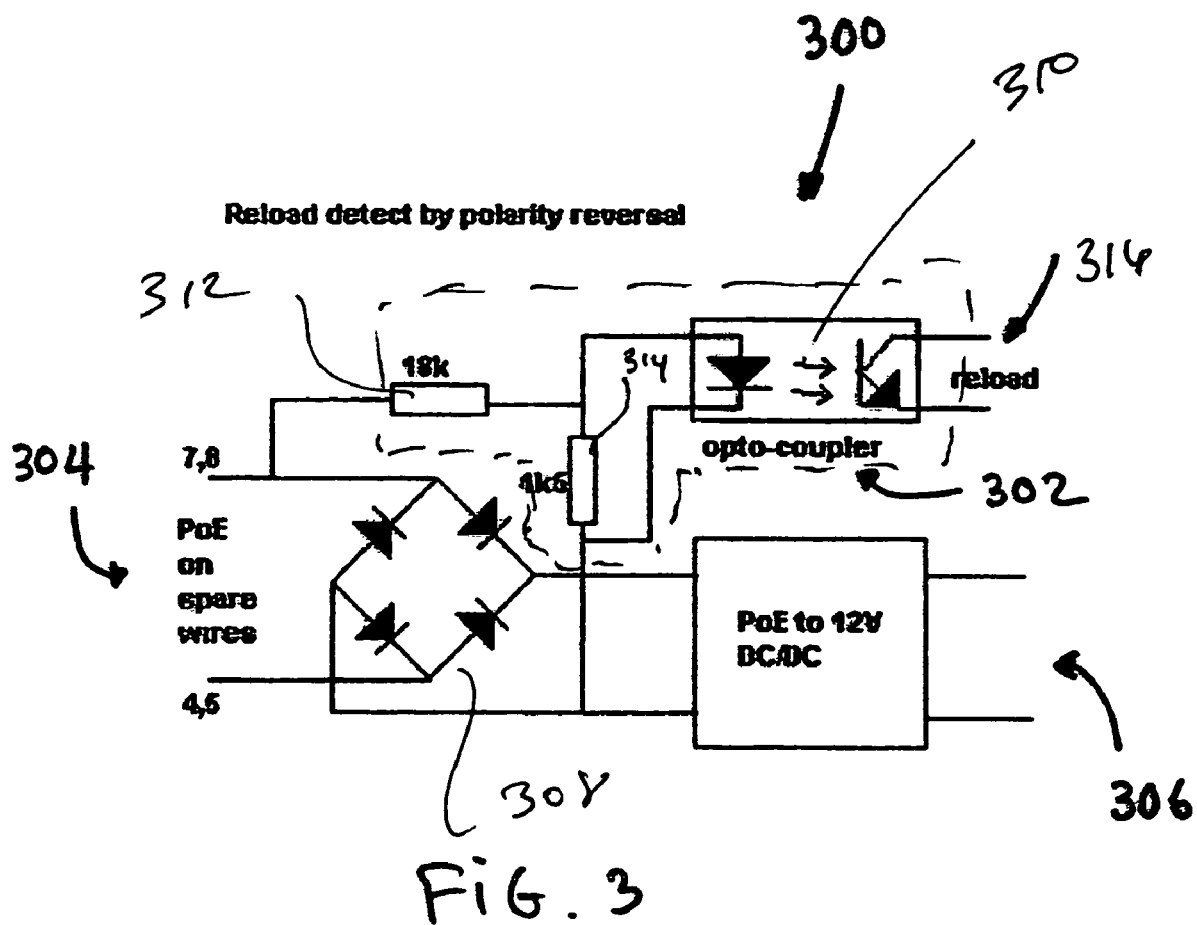
FIG. 3 illustrates a diagram of a reload detection circuit in accordance with an embodiment of the invention.

FIG. 3 illustrates an example of a detection and reload circuit 300 preferably located in the transceiver unit 102 in accordance with an embodiment of the invention. Alternatively, the circuit 300 is incorporated in a separate unit which couples to the circuitry of an existing transceiver unit 102. The circuit 300 shown in FIG. 3 preferably includes a detector and reload circuit 302, an input terminal 304 which receives current from the output terminal 204 of the power source 112 (FIGS. 2A and 2B), an output terminal 306, and a rectifier 308. However, it should be noted that the circuit 300 shown in FIG. 3 is just one embodiment and is not limited thereto.

It is preferred that the detect and reload circuit 302 includes an optocoupler diode 310 and a pair of resistors 312 and 314 in parallel with one another. In an embodiment, the current of the reverse voltage flows through resistors 312 and 314, whereby the reverse direction of current causes a change in voltage between resistors 312 and 314. This change in voltage at the junction between resistors 312 and 314 causes the optocoupler 310 to activate. Upon activation, the diode within the optocoupler 310 transmits a light to a transistor, whereby the transistor sends a voltage signal 316 to the transceiver unit 102 which represents that the Reload process is to be activated. The transceiver unit 102 will then initiate the Reload process, or alternatively Reset process, upon receiving this Reload signal.

In the shown embodiment the resistor 312 is preferably a 18k Ohm type and resistor 314 is preferably a 1.5k Ohm type. It should be noted that the circuit 302 is not limited to 2 resistors and/or the values of the resistors and can have any other configuration based on the power received and/or type of transceiver unit. It should also be noted that the circuit 302 does not necessarily include an optocoupler diode 310. For instance, a digital signal processor, other type of diode, or other electrical components can be utilized instead of the resistors 312, 314 and the optocoupler 310 to detect the reverse voltage and send the reload signal 316. Also, it should be noted that although the detect and reload elements of the circuit are shown as one component, separate detect and reload components can be alternatively implemented. The shown example with the opto-coupler provides galvanic insulation between input and output terminals, which avoids ground-loops, noise induction and other faults and to achieve safety requirements.

Figure 4:
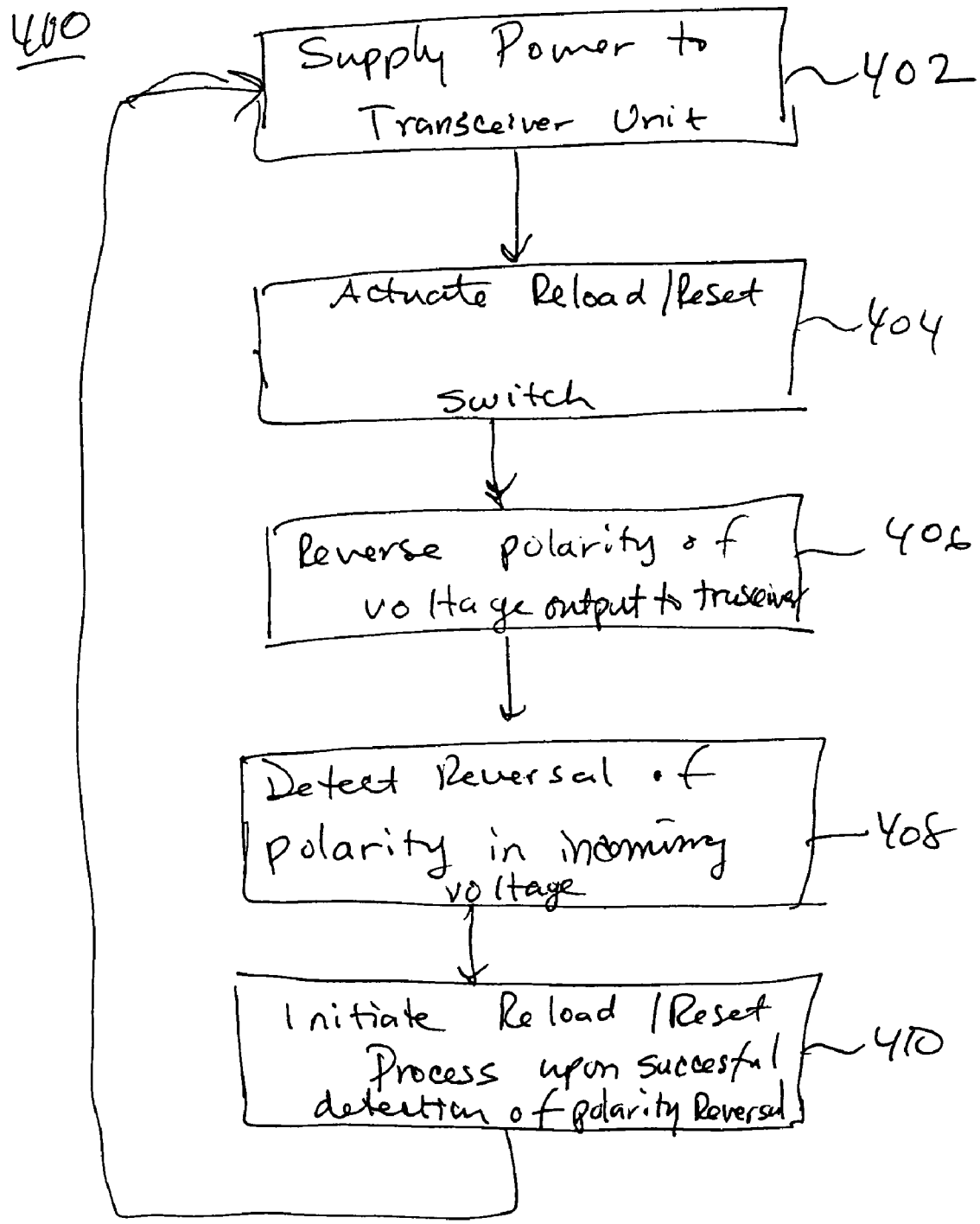
FIG. 4 illustrates a flow diagram of a method for remotely activating a reload procedure at a remote transceiver unit in accordance with an embodiment of the invention.

FIG. 4 illustrates a flow diagram of a method for remotely activating the Reload process in a transceiver unit in accordance with an embodiment of the invention. At step 402, power is supplied from a power source to a remote transceiver unit over an Ethernet powered cable. At step 404, the Reload (alternatively Reset) switch is actuated. As step 406, the reversal circuit reverses the voltage polarity output to the transceiver unit. As step 408, there is a detection as to whether the polarity of the supplied power over the Ethernet cable has reversed. At step 410, if a reversal in polarity of the supplied power has been detected, the circuitry and function of the reload button in the transceiver unit is activated, thereby reloading or resetting the transceiver unit. Those of ordinary skills in the art will recognize that many additional or alternative circuitries may be triggered using the above method.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. In a wireless network, a wireless transceiver unit powered by a remote power source via an Ethernet cable and that is not easily accessible, the transceiver unit comprising:
   a detector circuit at the transceiver unit and adapted to detect a reversal in polarity of power via the Ethernet cable from a remote power source; and
   a reload circuit coupled to the detector circuit, wherein the reload circuit activates a Reload procedure in the transceiver unit upon the detector circuit detecting the reversed polarity of power, so that the Reload procedure is triggered remotely using the remote power source and without having access to a reload switch at the transceiver unit, wherein the Reload procedure comprises a procedure for reloading default configuration parameters at the transceiver unit.

2. The transceiver unit of claim 1 wherein the remote power source is coupled to the transceiver unit via an Ethernet cable, wherein the power does not interfere with data signals transmitted to the transceiver unit.

3. The transceiver unit of claim 1 wherein the reversed polarity is provided to the transceiver unit for a threshold amount of time to activate the Reload procedure.

4. The transceiver unit of claim 1 wherein the reversed polarity is provided to the transceiver unit over a threshold amount of time to activate a Reset procedure in the transceiver unit.

5. The transceiver unit of claim 1 wherein the remote source further comprises a power injector having a Reload actuator.

6. The transceiver unit of claim 1 wherein the detect and reload circuits comprise an optocoupler.

7. A power source component adapted to be coupled to a wireless transceiver unit that is not easily accessible and that is remotely located from the power source, the power source comprising:
   a circuit adapted to receive a voltage and output the voltage to a remotely located transceiver unit; and
   a local switch coupled to the circuit, wherein the circuit reverses a polarity of the output voltage for a desired amount of time upon the local switch being activated, the circuit outputting the reversed polarity voltage to the remotely located transceiver unit, wherein in response to detection of the revised polarity voltage at the remotely located transceiver unit, a Reload procedure is remotely triggered in the transceiver unit in order to reload default configuration parameters.

8. The power source component of claim 7 wherein the power source unit is coupled to the transceiver unit via an Ethernet cable, wherein the power does not interfere with data signals transmitted to the transceiver unit.

9. The power source component of claim 7 wherein the reversed polarity is provided to the transceiver unit over the desired amount of time to activate a Reset procedure in the transceiver unit, wherein the Reset procedure restarts software in the transceiver unit.

10. The power source component of claim 7 further comprising at least one transistor configured to reverse the polarity of voltage output.

11. The power source component of claim 7 where the local switch reverses the polarity of voltage output.

12. A method for remotely triggering a function at a wireless transceiver unit that is not easily accessed, the method comprising:
   supplying a voltage from a power source to a remote transceiver unit over an Ethernet cable;
   reversing a polarity of the voltage supplied to the remote transceiver unit for a desired amount of time; and
   remotely triggering using the power source a reload procedure at the transceiver unit upon detecting the reversed voltage at the transceiver unit, the reload procedure for reloading default configuration parameters.

13. A system for remotely triggering a function in a wireless transceiver unit that is not easily accessed, comprising:
   means for supplying a voltage to a remote transceiver unit over an Ethernet cable;
   means for reversing a polarity of the voltage supplied to the remote transceiver unit for a desired amount of time;
   means for detecting the reversed voltage polarity at the transceiver unit; and
   means for remotely triggering using the means for supplying the voltage a reload procedure at the transceiver unit upon detecting the reversed voltage, the procedure for erasing and reloading configuration parameters.

14. A system for remotely triggering a function at a wireless transceiver unit that is not accessible itself for triggering the function, comprising:
   a power source remote from the transceiver unit, the power source configured to supply power to the transceiver unit and capable of reversing the polarity of the power supplied to the transceiver unit; and
   a detection circuit at the transceiver unit, the detection circuit configured to detect reversed polarity of power from the remote power source and configured to remotely trigger a procedure in response to the detection of the reversed polarity of power.

15. The system of claim 14 wherein the transceiver unit activates the procedure upon detecting the polarity reversal for a desired time duration.

16. The system of claim 14 wherein the transceiver unit activates the procedure upon detecting a plurality of polarity reversals in a time duration.

17. The system of claim 14 wherein the remote power source is coupled to the transceiver unit via an Ethernet cable, wherein the power does not interfere with data signals transmitted to the transceiver unit.

18. The system of claim 14 wherein the remote source further comprises a power injector having a local switch to reverse polarity.

19. The system of claim 14 wherein the detection circuit comprises an optocoupler to detect the polarity reversal and activate the procedure.

20. The system of claim 14, further comprising an accessible switch for causing the reversing of the polarity of power supplied by the power source.

21. The system of claim 14, wherein the power source is at an accessible location to thereby permit a user to actuate a switch at the power source to cause the reversing of the polarity of power supplied by the power source.

22. The system of claim 14, wherein the transceiver unit is a wireless transceiver in a wireless network.

23. The system of claim 22, wherein the procedure comprises a Reload procedure for reloading default configuration parameters into the wireless transceiver unit.

24. The system of claim 23 wherein the reversed polarity is provided to the transceiver unit for a threshold amount of time to activate the Reload procedure.

25. The system of claim 22, wherein the procedure comprises a Reset procedure for restarting software in the wireless transceiver unit.

26. The system of claim 25 wherein the reversed polarity is provided to the transceiver unit over a threshold amount of time to activate a Reset procedure in the transceiver unit.

* * * * *

UNITED STATES PATENT AND TRADEMARK OFFICE
CERTIFICATE OF CORRECTION

PATENT NO. : 7,668,572 B2 Page 1 of 1
APPLICATION NO. : 11/252976
DATED : February 23, 2010
INVENTOR(S) : Cor Van de Water It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 694 days.

Signed and Sealed this

Seventh Day of December, 2010

David J. Kappos
*Director of the United States Patent and Trademark Office*